Patented Apr. 8, 1952

2,592,301

UNITED STATES PATENT OFFICE 2,592,301

POLYMERIC 1,4-DICYANO-2-BUTENE

Robert G. Linville, Wilmington, Del., assignor to E. I. du Pont de Nemours & Company, Wilmington, Del., a corporation of Delaware No Drawing. Application November 14, 1949, Serial No. 127,250

2 Claims. (Cl. 260—78.4)

This invention relates to new compositions of matter, and more particularly to polymers and to their preparation.

This invention has as an object a new and useful polymeric material. Further objects reside in methods by means of which this polymeric material can be obtained readily. Other objects will appear hereinafter.

The new polymeric materials of this invention are polymers of 1,4-dicyano-2-butene which have a molecular weight of at least 400. These polymers are obtained by subjecting 1,4-dicyano-2-butene to polymerization conditions in the presence of an Alfin catalyst.

The examples which follow are illustrative of the practice of this invention.

Example I

A one-liter, four-necked flask especially designed for high speed stirring was charged with 40 grams of 1,4-dicyano-2-butene dissolved in 440 grams of dry benzene. Forty-five grams of an allylsodium/sodium isopropoxide suspension in benzene, prepared as described subsequently, was then added to the contents of the flask with vigorous stirring. A precipitate formed immediately. The reaction was exothermic, as evidenced by a rise in the temperature of the reaction mixture from about 25° C. to 42° C. The mixture was stirred for 30 minutes and 10 cc. of phosphoric acid (85%) was added to decompose the allylsodium/sodium isopropoxide catalyst. The solvent was decanted, the precipitate dissolved in phosphoric acid (85%) and the solution poured into ice water with vigorous stirring. The precipitate was a light yellow pliable polymer, which dried in a vacuum desiccator to a yellow powder. The powder was soluble in dimethylformamide, acetone, phosphoric acid and methyl Cellosolve. The yield of polymer having a molecular weight of 610–540 was 30 grams which corresponds to a 75% conversion. The polymer analyzed carbon 66.41; 67.15, 66.04%, ash 0.04%, hydrogen 5.91, 5.73, 5.76%, and nitrogen 24.28; 24.38%. Its softening point was 85°–87° C.

The allylsodium/sodium isopropoxide catalyst used in the above example was prepared as follows:

A one-liter, four-necked flask, attached to a high speed stirrer (10,000 R. P. M.), was charged with 500 ml. of dry decane and 23.5 g. of sodium (1 mole). The mixture was heated to 105–120° C. and stirred vigorously for two minutes. The heat was removed, the stirring stopped, and the sodium sand allowed to settle. The mixture was then cooled to —20° C. and addition of 62.5 g. of n-amyl chloride started. After the addition of approximately 10 ml. of amyl chloride the reaction mixture was stirred vigorously until a dark purple color developed, indicating the reaction had started. The remaining amyl chloride was added over a period of one hour at —20° C. and the suspension was allowed to warm to room temperature and stirred for 30 minutes to complete the reaction. The reaction mixture was cooled to 0° and 12.5 grams of isopropyl alcohol added. The reaction mixture was then cooled to —20° C. and propylene gas was bubbled through the suspension until the remaining amylsodium was completely converted to allylsodium. The propylene gas was passed into the suspension for three hours to insure the presence of excess propylene in the reaction system. The dark purple suspension was siphoned (under nitrogen atmosphere) into a one-liter bottle and stored under nitrogen for future use. One gram of this suspension contains approximately 0.331 gram of sodium isopropoxide and 0.24 gram of allylsodium.

Example II

Thirty-five grams of the catalyst suspension, prepared as described in Example I, was added to 220 grams of benzene. To this suspension there was added at room temperature, rapidly with stirring, twenty grams of 1,4-dicyano-2-butene dissolved in 176 grams of benzene. A precipitate formed immediately and the temperature rose to 40° C. The mixture was stirred for 30 minutes after completion of the addition of the 1,4-dicyano-2-butene and then 10 grams of glacial acetic acid was added. The benzene was removed by decantation, the precipitate dissolved in 85% phosphoric acid, and the solution poured into ice water with vigorous stirring. The product obtained was worked three times with distilled water and dried in a vacuum desiccator. The yield of product was 17.5 g.

Example III

Forty grams of 1,4-dicyano-2-butene was dissolved in 528 grams of benzene at 50° C. Twenty-five grams of the allyl-sodium/sodium isopropoxide catalyst suspension, prepared as described in Example I, was added rapidly to the solution and the mixture stirred rapidly for 30 minutes after completion of the addition. The benzene was removed by decantation from the precipitate which formed. The precipitate was dissolved in 85% phosphoric acid and the solution poured into ice water with vigorous stirring. The precipitate which formed was washed three times with distilled water. The washed precipitate was transferred to a vacuum desiccator and dried under vacuum at ambient temperature. The yield of product having a molecular weight at 410 was 23 grams. This product analyzed carbon 66.33, 66.58%, hydrogen 5.36, 5.63%, nitrogen 25.11, 25.54%, and ash 0.32%. Its softening point was 80–83°.

Example IV

Forty grams of 1,4-dicyano-2-butene was dissolved in 440 grams of benzene. To this solution there was then added rapidly with stirring, 15 cc. of the allylsodium/sodium isopropoxide catalyst suspension of Example I. A precipitate formed immediately. The benzene was removed from the precipitate by decantation, the precipitate was dissolved in 85% phosphoric acid, and the solution poured into ice water with vigorous stirring. The precipitate was worked three times with distilled water and dried. The yield was 9 grams which corresponds to a conversion of 22.5%. The product had a molecular weight of 610–640 and analyzed carbon 67.96, 67.69%, hydrogen 5.99, 5.89%, nitrogen 24.73, 24.01%, and ash 0.111%. Its softening point was 88–90° C.

The 1,4-dicyano-2-butene polymerized in accord with this invention is obtained by reacting with HCN the mixture of dichlorobutenes resulting from the chlorination of butadiene-1,3, as described in the copending applications of G. M. Whitman, Serial No. 696,356, filed September 11, 1946, and Serial No. 696,357, filed September 11, 1946, and that of J. R. Johnson and G. M. Whitman, Serial No. 696,358, filed September 11, 1946. The above mentioned applications are now abandoned.

The Alfin catalysts used in the preparation of the polymers of this invention are alkali metal salts of monoolefin hydrocarbons, especially of monoalkyl and 1,2-dialkyl substituted ethylenes, associated with an alkoxide of a methyl-n-alkyl carbinol. The name "Alfin catalyst" originates from the fact that these catalysts are formed from an alkoxide and a metalated olefin. The preparation of these Alfin catalysts is described in a paper by A. A. Morton, E. E. Magat, and R. L. Letsinger which appeared in J. Am. Chem. Soc. 69, 950–961 (1947). A typical preparation reported by these investigators is the following:

Amyl sodium is prepared by adding 0.5 mole of n-amyl chloride dropwise to one gram atom of sodium sand over a period of an hour at a temperature of −10° C. The temperature is maintained at −10° C. for 30 minutes following completion of the addition and then allowed to rise to 0° C. Isopropyl alcohol, in amount sufficient to form a ratio of 1 mole of sodium isopropoxide, is added dropwise over a period of 30 minutes. The temperature is allowed to rise to 20° C. to 30° C. for the rest of the reaction. After addition of the alcohol, the reaction mixture is stirred for 30 minutes and 500 cc. of n-pentane is added. At the end of 4 hours of stirring the product is transferred to a container and stored under nitrogen.

The sodium alkenyl compound component of the Alfin catalyst may be derived from any monoolefin hydrocarbon, such as ethylene, propylene, octene-1, hexene-1, cyclohexene, etc. The preferred monoolefin hydrocarbons are the monoalkyl and the 1,2-dialkyl substituted ethylenes, e. g., propylene, butene-2, and the like.

The sodium alkoxides are derived from such alcohols as propanol-2, butanol-2, pentanol-2, hexanol-2, heptanol-2, octanol-2, methylisopropyl carbinol, and the like.

In general the amount of Alfin catalyst employed will range from 5 to 40% by weight of the 1,4-dicyano-2-butene. Since better yields of polymer at reasonable reaction rates are obtained using catalyst concentrations ranging from 10 to 25% by weight of the 1,4-dicyano-2-butene, that is the amount generally employed.

The polymerization can be effected at temperatures ranging from −70° to +50° C. Generally, however, satisfactory reaction rates are obtained within the range of −10° to +20° C. and the polymerization is generally effected within that range.

The reaction may be conducted in open reactors or in closed reactors under autogenous pressure.

It is desirable to effect the polymerization in the presence of an inert reaction medium and suitable media are hexane, decane, cyclohexane, etc. The amount of reaction medium is such as to provide a solution of the 1,4-dicyano-2-butene ranging from 5 to 25% by weight in concentration.

The time required to effect the polymerization depends upon the amount of catalyst employed and the conditions employed. The reaction is conducted for such time as is necessary to produce polymer having a molecular weight of at least 400.

The polymers of this invention are useful as intermediates for the synthesis of polyamines for shrinkproofing wool, carboxylic acids, etc.

As many apparently widely different embodiments of this invention may be made without departing from the spirit and scope thereof, it is to be understood that I do not limit myself to the specific embodiments thereof except as defined in the appended claims.

I claim:

1. Polymeric 1,4-dicyano-2-butene having a molecular weight of at least 400.

2. The process which comprises polymerizing 1,4-dicyano-2-butene at a temperature of −70° C. to +50° C. in the presence of an Alfin catalyst.

ROBERT G. LINVILLE.

REFERENCES CITED

The following references are of record in the file of this patent:

UNITED STATES PATENTS

| Number | Name | Date |
|---|---|---|
| 2,342,101 | Cass et al. | Feb. 22, 1944 |
| 2,448,755 | Zellner | Sept. 7, 1948 |

OTHER REFERENCES

Morton et al., J. A. C. S. 69, pp. 950–61, April 1947.